United States Patent
Romano

(10) Patent No.: US 9,801,399 B2
(45) Date of Patent: Oct. 31, 2017

(54) METHODS AND DEVICES FOR FORMING FLATTENED FOOD PRODUCTS AND FOOD PRODUCTS THEREBY FORMED

(71) Applicant: Potato Flats Incubator Restaurant, LLC, Dallas, TX (US)

(72) Inventor: Philip J. Romano, Dallas, TX (US)

(73) Assignee: Potato Flats Incubator Restaurant, LLC, Dallas, TX (US)

(\*) Notice: Subject to any disclaimer, the term of this patent is extended or adjusted under 35 U.S.C. 154(b) by 27 days.

(21) Appl. No.: 14/688,733

(22) Filed: Apr. 16, 2015

(65) Prior Publication Data

US 2015/0296842 A1    Oct. 22, 2015

Related U.S. Application Data

(60) Provisional application No. 61/980,449, filed on Apr. 16, 2014.

(51) Int. Cl.

| | |
|---|---|
| A23L 1/00 | (2006.01) |
| A23L 1/216 | (2006.01) |
| A23P 1/10 | (2006.01) |
| B30B 1/04 | (2006.01) |
| B30B 11/04 | (2006.01) |
| A47J 43/20 | (2006.01) |
| A23P 20/20 | (2016.01) |
| A23P 30/10 | (2016.01) |
| A23L 19/18 | (2016.01) |
| A23L 19/12 | (2016.01) |

(52) U.S. Cl.
CPC .............. *A23L 1/0073* (2013.01); *A23L 19/18* (2016.08); *A23P 20/20* (2016.08); *A23P 30/10* (2016.08); *A47J 43/20* (2013.01); *B30B 1/04* (2013.01); *B30B 11/04* (2013.01); *A23L 19/12* (2016.08)

(58) Field of Classification Search
CPC . B30B 11/04; B30B 1/04; A23L 19/18; A23L 1/0073; A23L 19/12
USPC ................................ 426/637, 512; 100/293
See application file for complete search history.

(56) References Cited

U.S. PATENT DOCUMENTS

| | | | |
|---|---|---|---|
| 1,459,976 A * | 6/1923 | Gore ................... | A21C 11/006 123/61 V |
| 3,468,355 A * | 9/1969 | Hall ........................ | B26D 3/26 99/537 |
| 3,880,064 A | 4/1975 | Martinez | |
| 4,084,493 A | 4/1978 | Quintana | |

(Continued)

OTHER PUBLICATIONS

Cookipedia "Tortilla Press"; http://www.cookipedia.co.uk/wiki/index.php/Tortilla_press; Aug. 2, 2010—1 Page.

*Primary Examiner* — Dana Ross
*Assistant Examiner* — Kuangyue Chen

(57) ABSTRACT

An apparatus includes a press configured to compress at least a portion of a food item to deform the food item and form a flattened food product. The press includes a movable portion and a lift arm pivotally attached to the movable portion, where the lift arm is configured to raise or lower the movable portion. The movable portion includes a punch projecting from the movable portion. The punch is configured, when the movable portion is moved by the lift arm, to reshape the food item such that the flattened food product has at least a flattened central portion.

20 Claims, 15 Drawing Sheets

(56) References Cited

U.S. PATENT DOCUMENTS

| | | | | |
|---|---|---|---|---|
| 4,973,240 | A | * | 11/1990 | Reilly .................. A21C 11/006 |
| | | | | 425/195 |
| 5,964,144 | A | | 10/1999 | Chapa |
| 6,089,144 | A | | 7/2000 | Garber et al. |
| 7,631,679 | B1 | * | 12/2009 | Hui .......................... B26D 7/34 |
| | | | | 156/250 |
| 2007/0044619 | A1 | * | 3/2007 | Farid ....................... B26D 3/26 |
| | | | | 83/620 |

* cited by examiner

METHODS AND DEVICES FOR FORMING FLATTENED FOOD PRODUCTS AND FOOD PRODUCTS THEREBY FORMED

CROSS-REFERENCE TO RELATED APPLICATION AND PRIORITY CLAIM

This application claims priority under 35 U.S.C. §119(e) to U.S. Provisional Patent Application No. 61/980,449 filed on Apr. 16, 2014. This provisional patent application is hereby incorporated by reference in its entirety.

TECHNICAL FIELD

This disclosure relates generally to food processing and, more specifically, to methods and devices for forming flattened food products and the food products thereby formed.

BACKGROUND

The restaurant industry is becoming increasingly competitive, with consumers seeking novel dining experiences and healthy food choices. Baked potatoes are a generally popular food item often perceived as a healthy or appropriate food choice. Baked potatoes are almost universally served in the same conventional manner, namely as a split potato that is optionally topped with one or more condiments or other food ingredients selected from a limited range of choices.

SUMMARY

This disclosure provides methods and devices for forming flattened food products and the food products thereby formed.

In a first embodiment, an apparatus includes a press configured to compress at least a portion of a food item to deform the food item and form a flattened food product. The press includes a movable portion and a lift arm pivotally attached to the movable portion, where the lift arm is configured to raise or lower the movable portion. The movable portion includes a punch projecting from the movable portion. The punch is configured, when the movable portion is moved by the lift arm, to reshape the food item such that the flattened food product has at least a flattened central portion.

In a second embodiment, a method includes placing a food item into a press, where the press has a movable portion and a lift arm pivotally attached to the movable portion. The lift arm is configured to raise or lower the movable portion. The method also includes compressing at least a portion of the food item using the press to deform the food item and form a flattened food product. The movable portion includes a punch projecting from the movable portion. The punch is configured, when the movable portion is moved by the lift arm, to reshape the food item such that the flattened food product has at least a flattened central portion.

In a third embodiment, a food product includes a flattened food item having at least a flattened central portion corresponding to compression of a food item by a press and extrusion of the food item to form a periphery elevated above the flattened central portion.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Definitions for other certain words and phrases may be provided in this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1A through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

This disclosure describes various methods and devices for forming flattened food products. In the following description, reference is made to flattened food products having different shapes, such as "discs," "flats," "dishes," and "bowls" (distinguished primarily by the height of any edges of the flattened food products). These are for illustration only and represent example ways in which a food item can be partially or completely flattened to form a flattened food product. Flattened food products of other forms could also be created in accordance with this disclosure. Also, a food item to be at least partially flattened may be described below as a mass of starchy semi-soft food, such as a baked potato.

However, any other suitable food items could be used to form flattened food products in accordance with this disclosure.

Figure 1A:
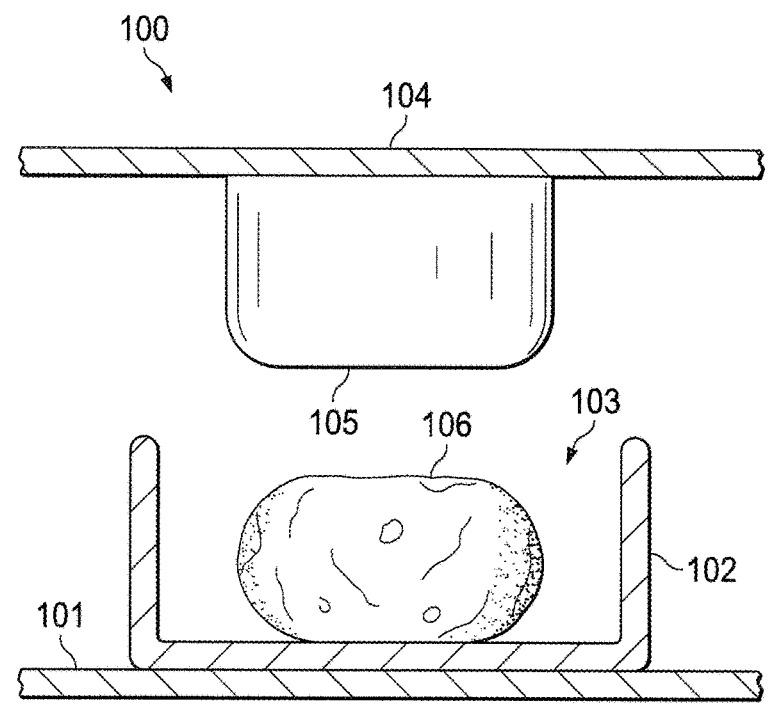
FIGS. 1A through 2B illustrate example formations of flattened food products by compression and deformation of food items in accordance with this disclosure.

FIGS. 1A through 2B illustrate example formations of flattened food products by compression and deformation of food items in accordance with this disclosure. As shown in FIGS. 1A and 1B, a press 100 is employed in the formation of a flattened food product. In this example, a lower support 101 holds a form bowl 102 within which the flattened food product will be formed. The bowl 102 could be formed from any suitable material(s). For example, the bowl 102 could be formed from a lightweight and high impact strength material, such as aluminum or other metal or thermoplastic (like polycarbonate). The choice of material(s) could depend, among other things, on whether the form bowl 102 represents a reusable structure or a structure that is used once and discarded. The form bowl 102 could also have any suitable size, shape, and dimensions. In this example, the form bowl 102 has a recess 103 defining a shape of the lower, outer perimeter of the flattened food product to be formed. While the recess 103 has a substantially cylindrical shape with rounded lower corners here, other shapes could be used.

An upper portion of the press 100 includes a support 104 on which is mounted a projecting punch 105. The punch 105 is sized to fit within at least part of the recess 103 of the form bowl 102. When the punch 105 is moved within the recess 103, a space exists between the bottom of the recess 103 and the lowermost surface of the punch 105, and a space may also optionally exist between the outer circumference of the punch 105 and the sidewalls of the recess 103. In the example depicted in FIGS. 1A and 1B, the punch 105 is generally cylindrical with rounded corners between its sidewalls and its lowermost surface, although other shapes could be used. For instance, the sidewalls of the punch 105 could alternatively be slightly sloped or battered so that the punch 105 has a frustoconical shape (a shape of a cone with its pointed end removed).

In one aspect of operation, the upper press portion of the press 100 is initially spaced some distance above the form bowl 102 as shown in FIG. 1A. A food item 106 that will form the flattened food product is placed within the recess 103 of the form bowl 102. The food item 106 may have been previously cooked, such as by baking, boiling, or microwaving, until semi-soft (that is, somewhat soft inside and readily mashed or otherwise deformable). In some embodiments, the food item 106 represents a baked potato, such as a whole baked potato. Other examples of food items 106 could include various semi-soft (and possibly surface-cut) edible tuberous roots or taproots, such as sweet potatoes, yams, cassava roots, carrots, or beetroots. However, any other suitable food items could be used.

Note that the food item 106 could represent a single whole food item, multiple whole food items, or multiple pieces of one or more food items. For example, two or more cooked semi-soft potatoes or other food items may be used to form a flattened food product. As another example, a number of chunks of cooked semi-soft potato or other edible tuberous roots or taproots, a mixture of chunks of different edible tuberous roots or taproots cooked until semi-soft, or some other mass of food that is readily deformable (such as mashed potatoes) may be used to form the flattened food product.

Various pre-deformation modifications can also be made to the food item 106. For instance, the skin of a potato may be cut along one or more outer surfaces to some depth in order to facilitate deformation under compression. As another example, part of the skin of a potato could be removed, and a central portion of the potato could be cut, mashed, or otherwise modified prior to deformation using the press 100.

Figure 1B:
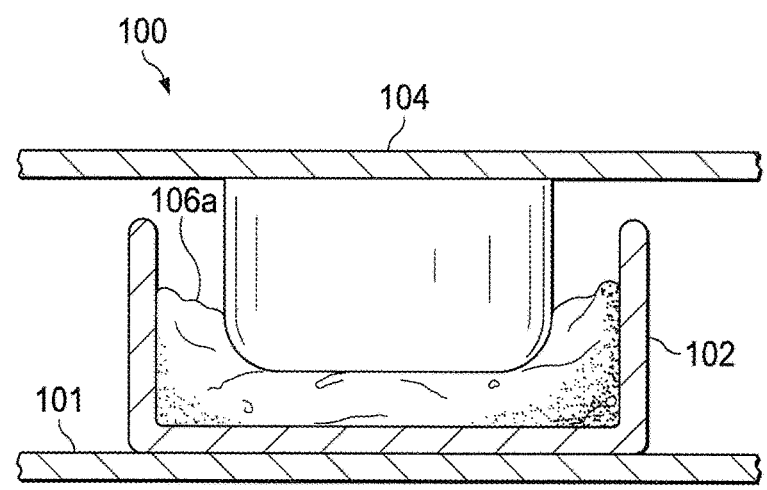

In whatever form selected to form an edible flattened food product, the food item 106 could be placed roughly within the center of the recess 103 as shown in FIG. 1A. As shown in FIG. 1B, the upper press portion of the press 100 is then lowered until the punch 105 is positioned within the recess 103 of the form bowl 102. In the course of such lowering, the punch 105 contacts and deforms the food item 106 by compression, reshaping the food item 106 to form an edible flattened food product 106a within the form bowl 102.

During the deformation of the food item 106, the food item 106 could be compressed to be substantially completely flat. When this occurs, little if any of the food item 106 may extend over to and contact the sidewalls of the form bowl 102. However, as shown in FIG. 1B, part of the food item 106 can also extrude into the regions between the sidewalls of the punch 105 and the sidewalls of the form bowl 102, forming raised edges of the flattened food product 106a.

The flattened food product 106a could have any suitable size, shape, and dimensions. For example, in some embodiments, the flattened food product 106a is formed so that the central portion of the flattened food product 106a has a thickness of about 1 to 1.5 inches, although other thicknesses may be acceptable for the purposes described below. The compression during reshaping of the food item 106 to form the flattened food product 106a can also increase the density and/or rigidity (malleability) of the food product material. That change in density and/or rigidity can improve the ability of the flattened food product 106a to remain intact during preparation of a finished food product as described below.

Figure 2A:
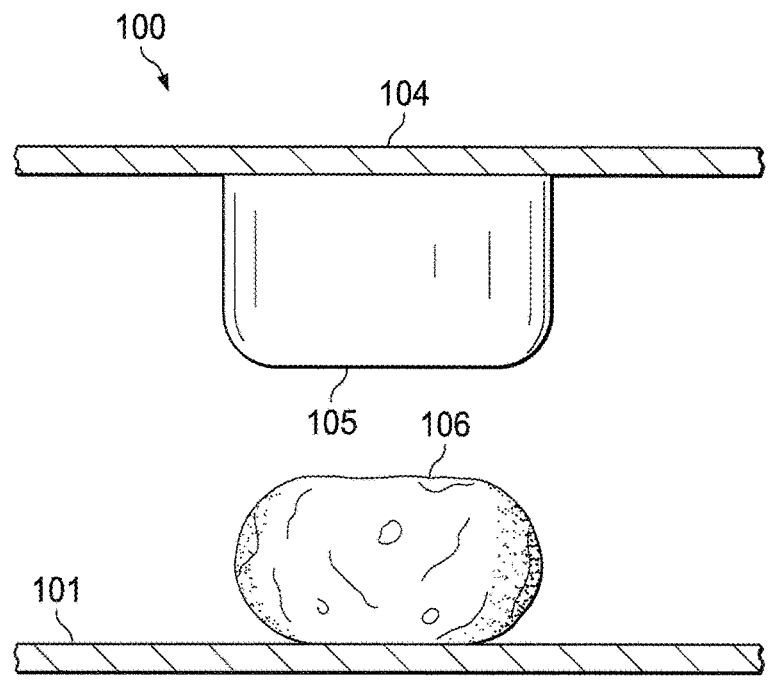
Figure 2B:
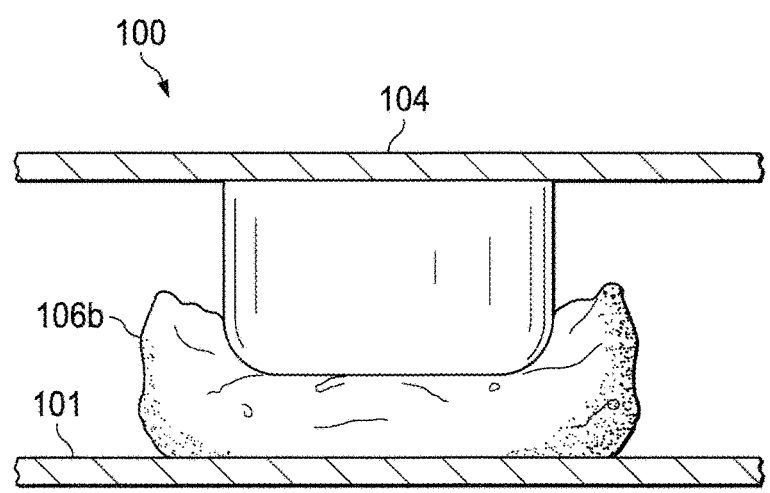

As shown in FIGS. 2A and 2B, the same press 100 described in connection with FIGS. 1A and 1B can also be used without the form bowl 102 to create a flattened food product 106b. As noted above, the food item 106 could be deformed to be substantially completely flat to form the flattened food product 106b. However, in this example, the flattened food product 106b again has raised edges produced during the formation of a central depression in the flattened food product 106b.

Note that the lowermost surface of the punch 105 shown in FIGS. 1A through 2B is smooth. This is for illustration only. The lowermost surface of the punch 105 could have any other suitable configuration, such as raised edges, blades, or other structures.

Although FIGS. 1A through 2B illustrate examples of formations of flattened food products by compression and deformation of food items, various changes may be made to FIGS. 1A through 2B. For example, the sizes, shapes, and dimensions of each component shown in FIGS. 1A through 2B are for illustration only. Also, a food item 106 or a flattened food product 106a-106b could be placed on any other suitable carrier and is not limited to use with just a form bowl 102 or the lower support 101. For instance, a food item 106 or a flattened food product 106a-106b could be placed on a reusable or disposable plate or dish; a paper, STYROFOAM, or other container; or any other suitable food carrier. As a particular example, the food item 106 could be placed on a thin flexible paper or plastic sheet, and after deformation the flattened food product 106a-106b can be lifted using the sheet and placed in a basket or other structure for a customer. As another particular example, the food item 106 could be placed on a disposable plate or dish, and a thin flexible paper or plastic sheet could be placed over the food item 106 prior to deformation to help keep the punch 105 relatively free of food particles or other debris while the food item 106 is flattened into the plate or dish. Further, while the press 100 is shown with a movable upper portion and a fixed lower portion, the upper portion could be fixed and the lower portion could be movable, or both portions of the press could be movable. In addition, various other features could be employed with the press 100. For instance, a splash guard may be mounted around the outer perimeter of the press 100 or portion thereof to prevent food from being ejected onto surrounding objects as the punch 105 drops onto and compresses/deforms the food item 106.

FIGS. 3A through 3D illustrate example flattened food products formed by compression and deformation of food items in accordance with this disclosure. The flattened food products shown here could, for example, be formed using the press 100 described above. Note, however, that the flattened food products could be formed using any other suitable devices.

Figure 3A:
FIGS. 3A through 3D illustrate example flattened food products formed by compression and deformation of food items in accordance with this disclosure.

FIG. 3A illustrates a food "disc," which represents a food product that has been substantially completely flattened. The food disc here lacks any significant raised edges. The food disc can be formed, for example, when the food item 106 does not extend beyond the sidewalls of the punch 105 during deformation of the food item 106. The food item 106 may or may not be held in a form bowl 102 during deformation of the food item 106 to produce the food disc.

Figure 3B:
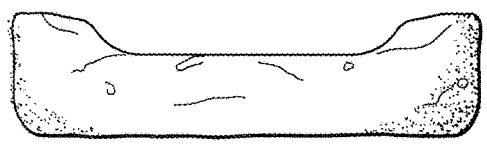

FIG. 3B illustrates a food "flat," which represents a food product having slightly raised edges with relatively flat side edges. The food flat can be formed, for example, when the food item 106 extends slightly beyond the sidewalls of the punch 105 during deformation of the food item 106. The food item 106 is placed in a form bowl 102 during deformation of the food item 106 in order to form the slightly raised edges of the food flat.

Figure 3C:

FIG. 3C illustrates a food "dish," which again represents a food product having slightly raised edges. The food dish can be formed, for example, when the food item 106 extends slightly beyond the sidewalls of the punch 105 during deformation of the food item 106. The food item 106 may not be placed in a form bowl 102 during deformation of the food item 106, but the depression of the punch 105 into the food item 106 still creates the slightly raised edges as shown in FIG. 2B.

Figure 3D:
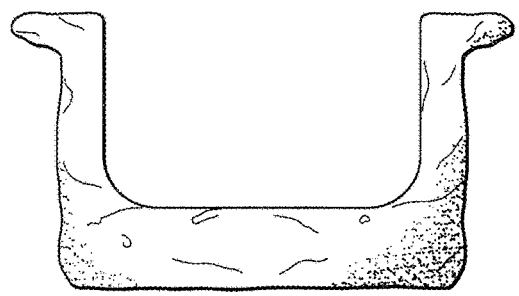

FIG. 3D illustrates a food "bowl," which represents a food product having taller raised edges. The food bowl can be formed, for example, when the food item 106 extends beyond the sidewalls of the punch 105 during deformation of the food item 106. The sidewalls of the form bowl 102 push the peripheral portions of the food item 106 upward to form the taller raised edges.

As described in more detail below, the flattened food products of FIGS. 3A through 3D can be utilized both as edible products for customers and as containers to receive, support, and/or be filled with condiments or other food ingredients (referred to collectively as "toppings"). For example, after a flattened food product is formed, one or more toppings can be placed into or onto the flattened food product. A customer may then eat the toppings as well as the flattened food product into or onto which the toppings were placed.

Although FIGS. 3A through 3D illustrate examples of flattened food products formed by compression and deformation of food items, various changes may be made to FIGS. 3A through 3D. For example, as noted above, the flattened food products need not have smooth surfaces, and flattened food products could have any suitable regular or irregular surfaces and shapes. In general, a flattened food product denotes any food item where at least a portion of the food item has been flattened compared to its original state. Often times, at least the central portion of a food item is flattened to produce a flattened food product, although the flattening need not be centered.

Figure 4A:
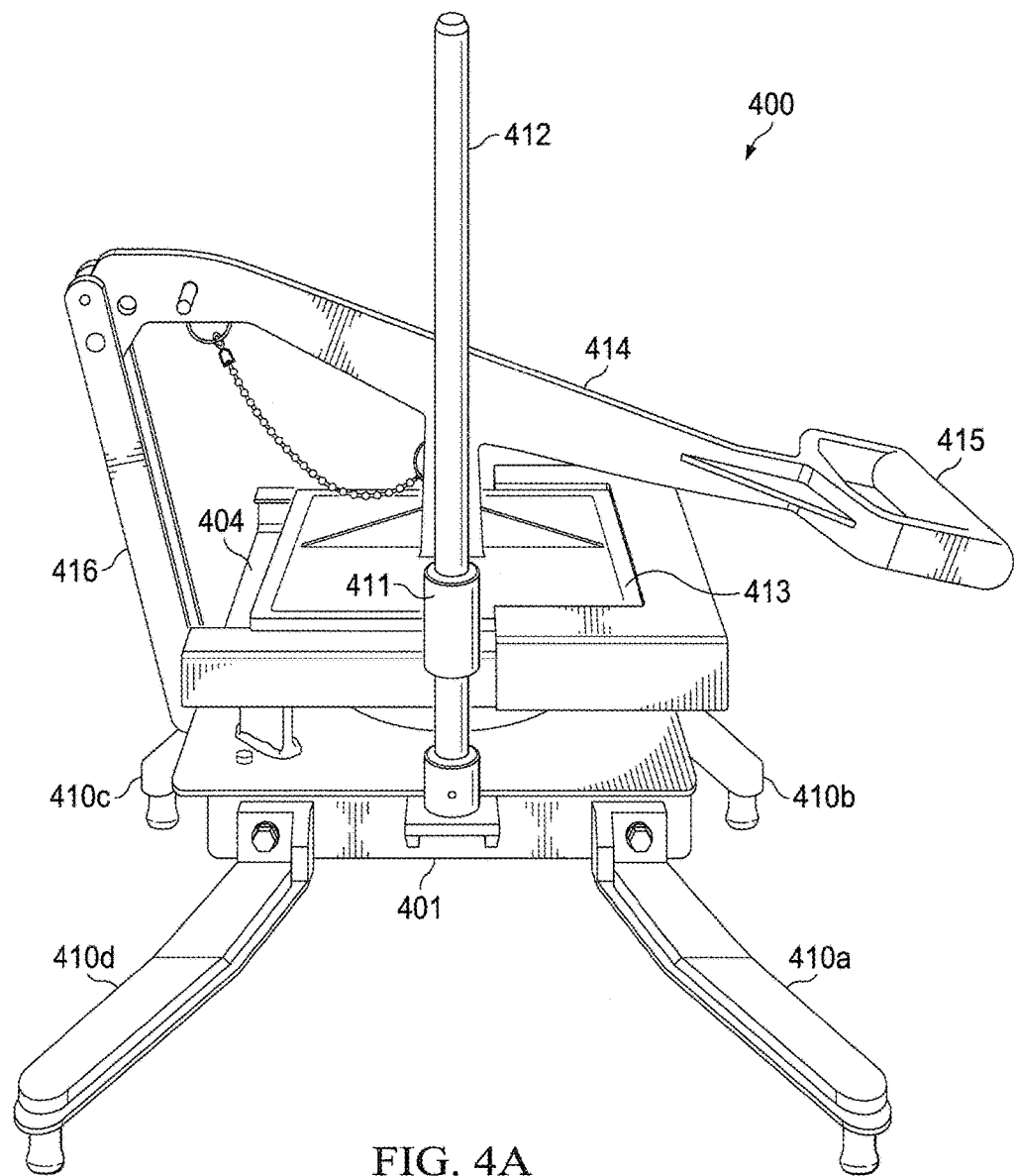
FIGS. 4A through 4G illustrate a first example press used to compress and deform food items in order to create flattened food products in accordance with this disclosure.
Figure 4B:
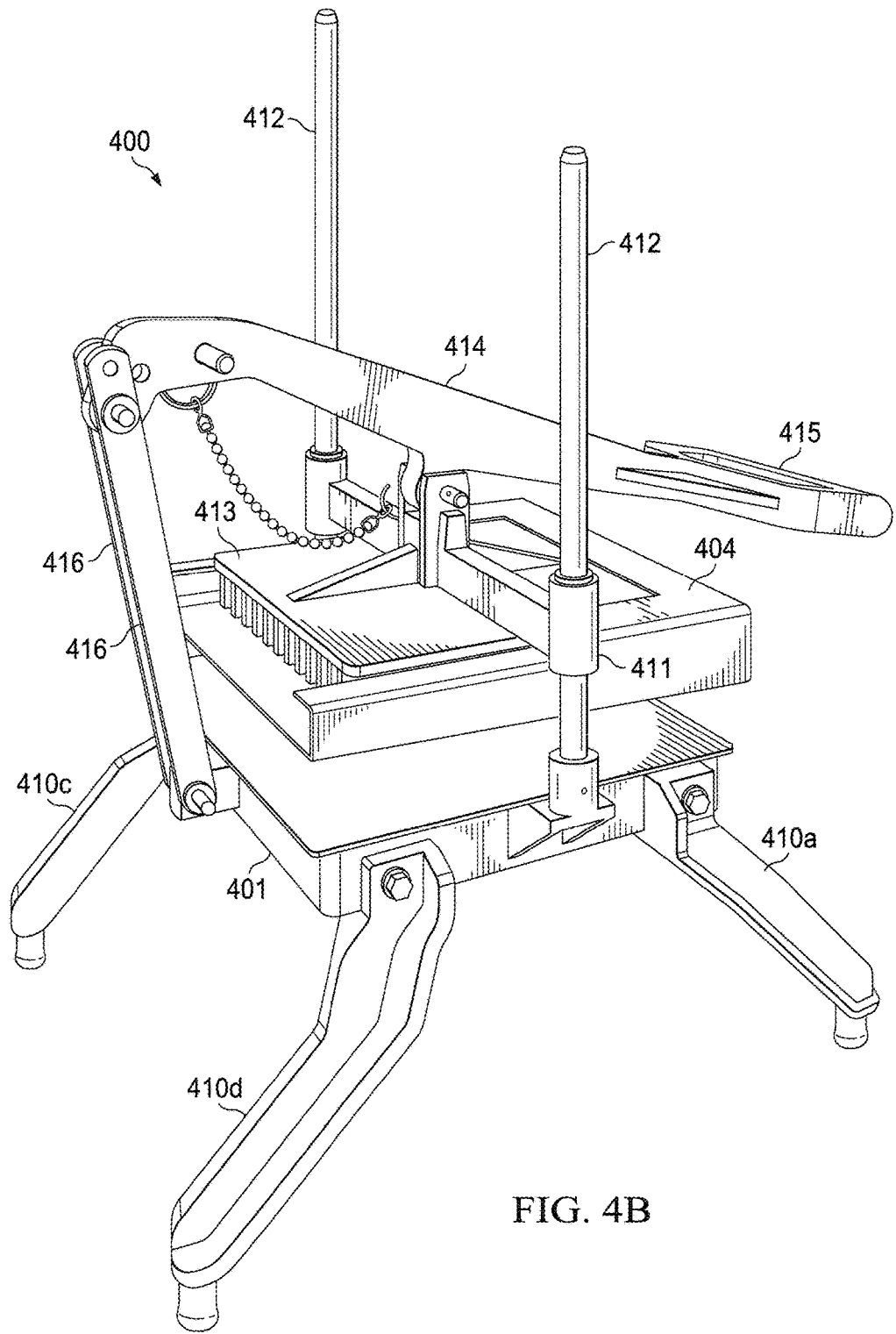
Figure 4C:
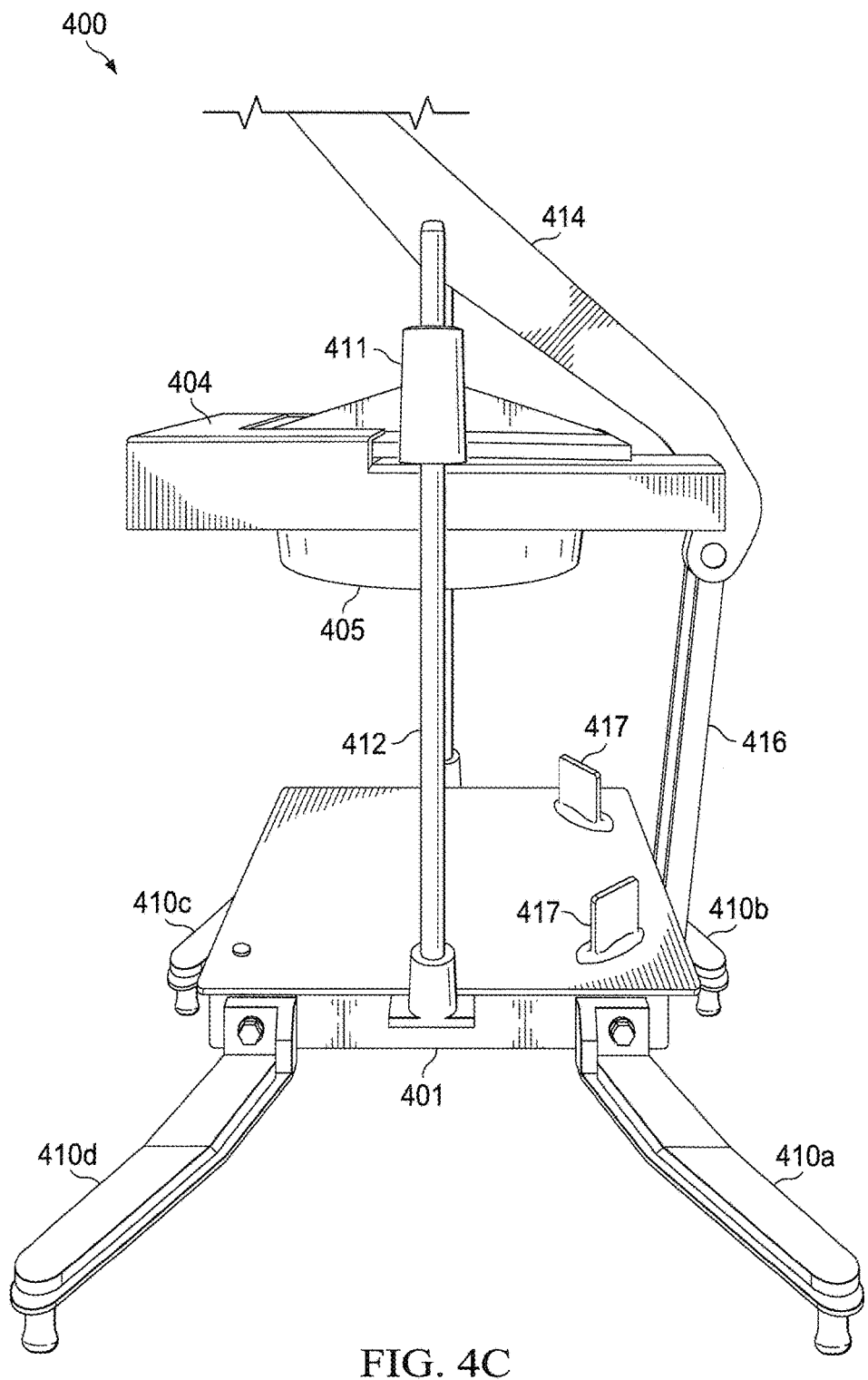

FIGS. 4A through 4G illustrate a first example press 400 used to compress and deform food items in order to create flattened food products in accordance with this disclosure. More specifically, FIG. 4A is a side elevation view and FIG. 4B is an oblique perspective view of the press 400, where an upper press portion is at its limit of downward travel. FIG. 4C is a side perspective view (from the side opposite that of FIG. 4A) of the press 400, where the upper press portion is at its limit of upward travel. FIGS. 4D through 4G illustrate additional details of the press 400.

The press 400 depicted here operates with a form bowl, such as the form bowl 102 described above. The form bowl 102 is used to hold a food item 106 and can optionally be used to help form raised edges of a flattened food product 106a-106b during deformation of the food item 106. However, as noted above, the use of the form bowl 102 is optional, and the press 400 could be modified to omit the use of a form bowl.

As shown in FIGS. 4A through 4C, a lower support 401 of the press 400 is mounted on four projecting support legs 410a-410d. In the example shown, each support leg 410a-410d terminates with a rubber or elastomeric foot or tip at the bottom designed to grip an underlying supporting surface (such as a counter) and prevent the press 400 from unintended incidental movement during use.

Figure 4D:
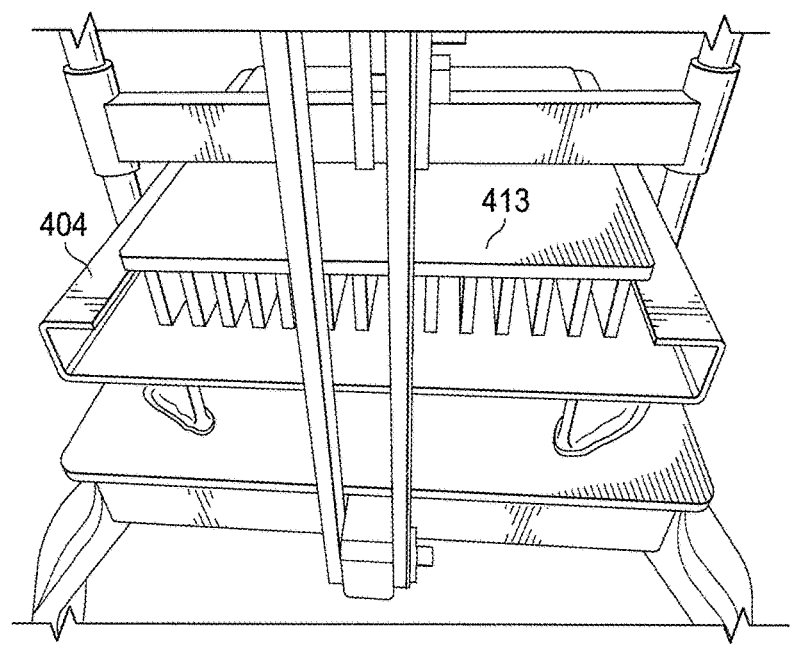

An upper portion 404 of the press 400 includes projecting annular guides 411 attached to a crossbar across the top of the upper portion 404. The annular guides 411 receive and slide along guide rods 412 to define a substantially linear path of movement between a lowermost limit of travel and an uppermost limit of travel. A weight member 413, more clearly visible in FIG. 4D, is secured to and forms part of the upper portion 404 of the press 400. The weight member 413 allows the upper portion 404 of the press 400 to function as intended when merely dropped from a suitable position as described below.

A lift arm 414 terminates at one end with a handle 415 and is pivotally attached near a center of the lift arm 414 to the crossbar across the top of the upper portion 404 of the press 400. The opposite end of the lift arm 414 is pivotally connected to a pair of parallel lever arms 416, which are pivotally connected at an opposite end to a projecting flange on one side of the support 401. This configuration of the lift arm 414 and lever arms 416 allows the upper portion 404 of the press 400 to be manually raised using the handle 415, guided by the annular guides 411 sliding on the guide rods 412, to an uppermost limit of travel.

Figure 4E:
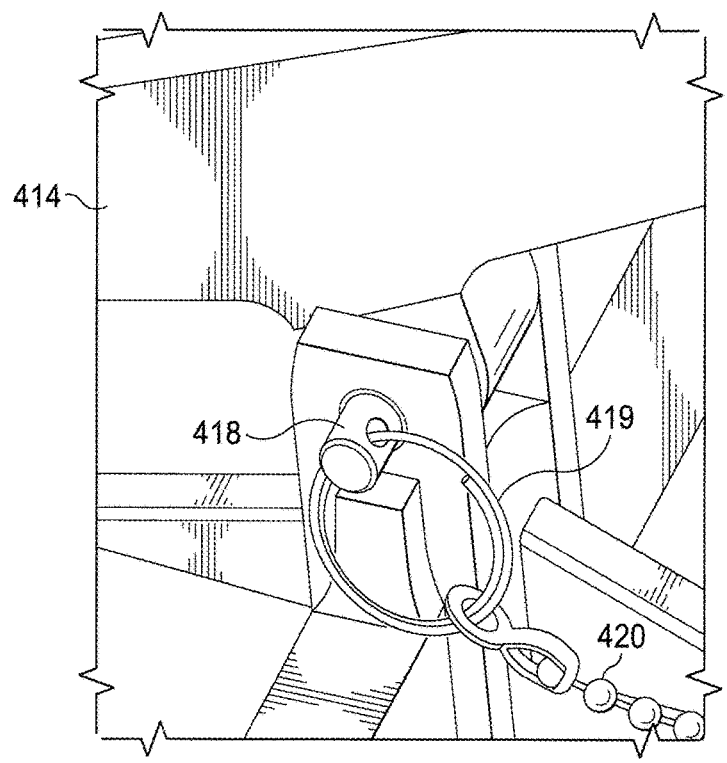

The pivot connection of the lift arm 414 to the crossbar on the upper portion 404 of the press 400, shown in greater detail in FIG. 4E, can be effected by a removable detent pin 418 that is secured to the structure of the press 400 by a ring 419 through one end of the pin 418 and a lanyard 420 attached to the ring 419. As known in the art, the detent pin 418 includes a spring-biased ball at the end opposite the ring 419 to inhibit inadvertent removal of that pin 418.

Figure 4F:
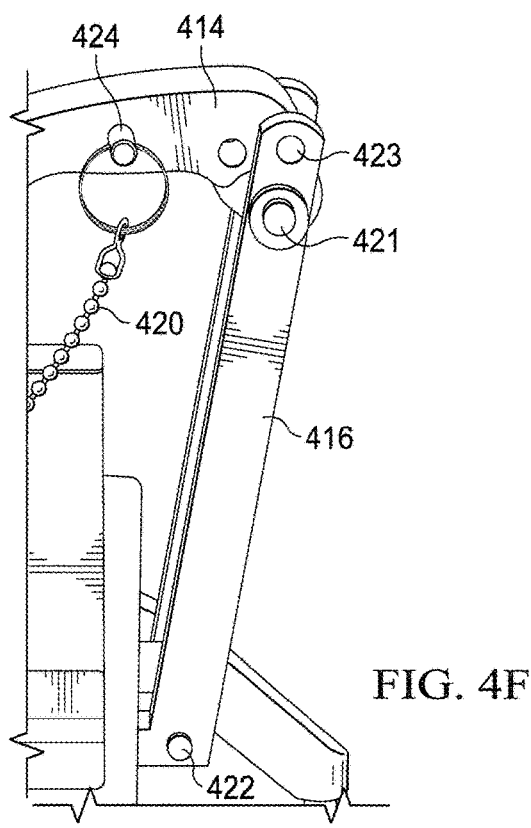
Figure 4G:
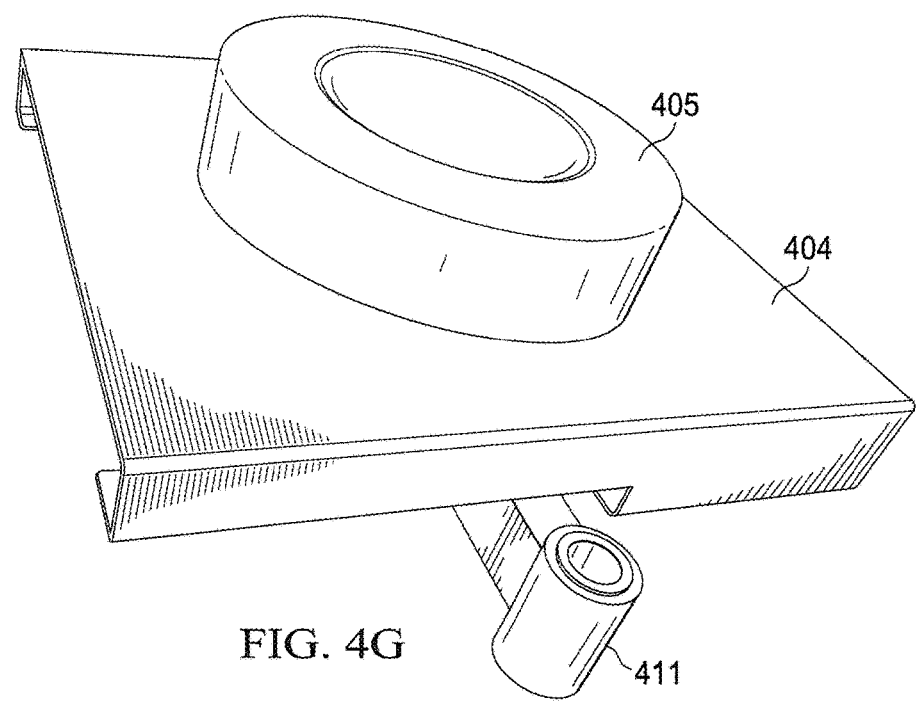

As shown in FIG. 4F, the pivot connections of the lift arm 414 to the lever arms 416 and of the lever arms 416 to the support 401 can be effected by a headed pin 421-422 receiving a cotter pin at the non-headed end that is inserted through pivot holes through the lift arm 414 and the lever arms 416. The lift arm 414 and the lever arms 416 also include locking holes 423 positioned to allow, by insertion of another detent pin 424 through those holes 423 when aligned, locking of the upper portion 404 to the structure of the press 400 at a position at or near the uppermost limit of travel. The detent pin 424 in FIG. 4F is shown in a storage location within another hole in the lift arm 414.

More clearly visible in FIG. 4C is a punch 405 projecting from the lower surface of the upper portion 404 of the press 400 and a pair of guide tabs 417 projecting from the upper surface of the support 401. The punch 405 is also shown in greater detail in the perspective view of the upper portion 404 from the bottom in FIG. 4G. The punch 405 functions as described above in forming a flattened food product. The two guide tabs 417, which can be oriented at right angles to each other, allow a form bowl to be quickly positioned at a proper location on the support 401 for correct operation of the press 400. That is, the form bowl (such as one having a specified diameter corresponding to the outer diameter of the punch 405) can be positioned with a side abutting both guide tabs 417, thereby properly placing the form bowl for correct operation of the press 400.

Figure 5A:
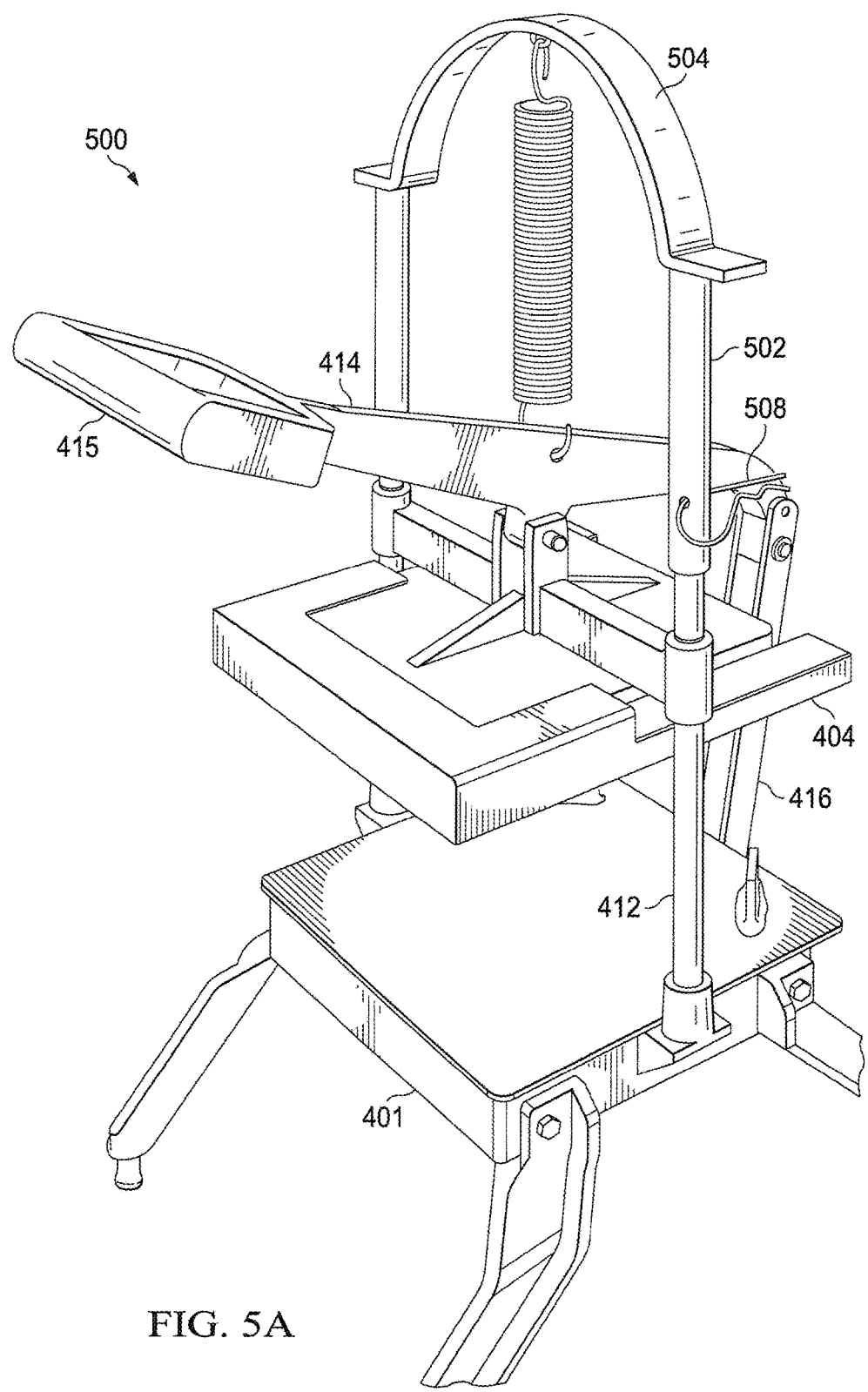
FIGS. 5A through 5C illustrate a second example press used to compress and deform food items in order to create flattened food products in accordance with this disclosure.
Figure 5B:
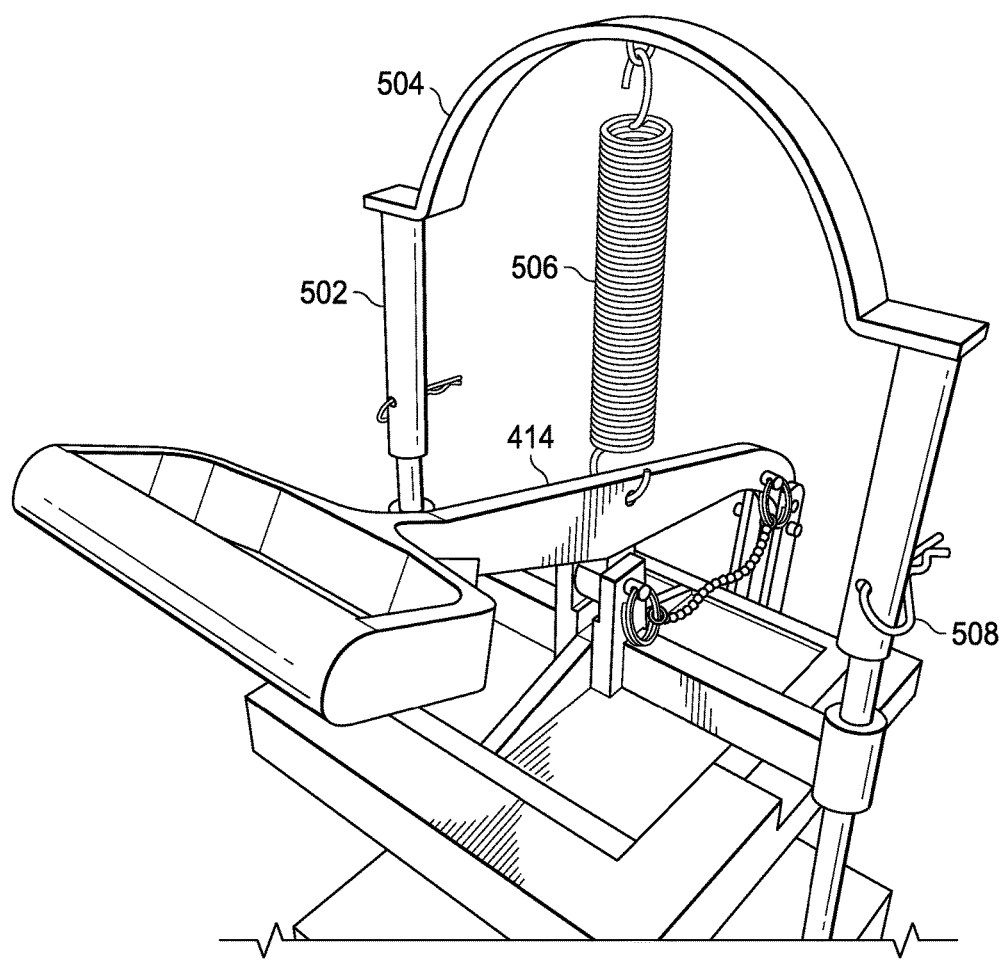
Figure 5C:
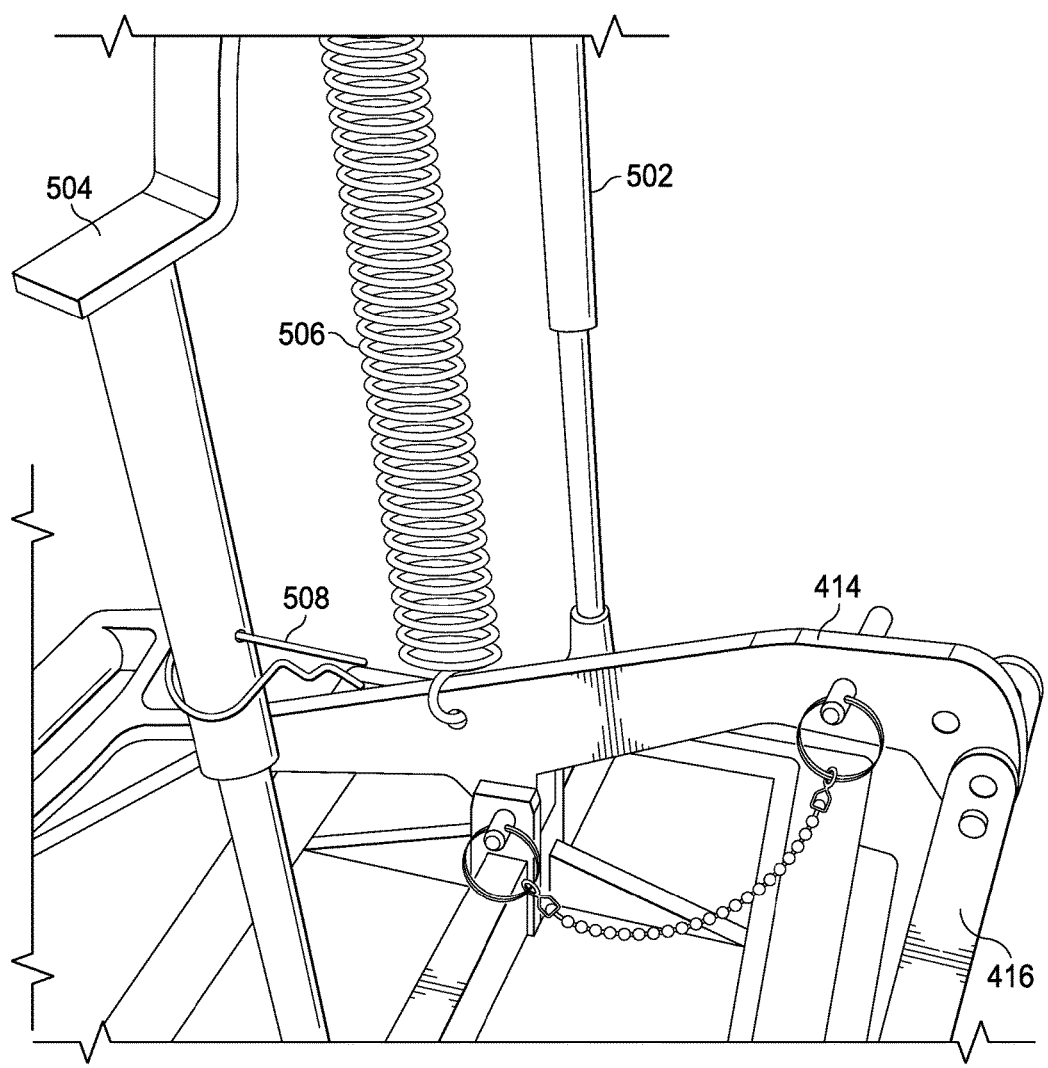

FIGS. 5A through 5C illustrate a second example press 500 used to compress and deform food items in order to create flattened food products in accordance with this disclosure. Various components of the press 500 may be the same as or similar to corresponding components of the press 400 and are given the same reference numerals in FIGS. 5A through 5C.

The press 500 differs from the press 400 in that the press 500 includes a mechanism to bias the upper portion 404 of the press 500 in a raised position. As shown in FIGS. 5A through 5C, the biasing mechanism includes vertical extensions 502 and a connecting portion 504 that couples the vertical extensions 502. The biasing mechanism also includes a spring 506 coupling the connecting portion 504 to the lift arm 414. The vertical extensions 502 are connected to the guide rods 412 using hairpin cotter pins 508.

As shown in FIGS. 5A and 5B, the spring 506 has pulled the lift arm 414 upward, causing the upper portion 404 of the press 500 to move to or near its limit of upward travel. In this position, a food item (possibly in a form bowl 102) can be placed under the upper portion 404 of the press 500. As shown in FIG. 5C, the lift arm 414 has been lowered, such as when an operator manually presses the handle 415 downward. This lowers the upper portion 404 of the press 500 to flatten the food item. This also causes the spring 506 to extend, and the lift arm 414 is then raised by the spring 506 once the pressure on the handle 415 is released. In this way, the lift arm 414 can be held in a raised position without external interference but can be easily lowered by an operator.

The vertical extensions 502 and the connecting portion 504 could form an integral structure or be formed as separate components that are attached to one another. The vertical extensions 502 and the connecting portion 504 could also be formed integral with the guide rods 412. In addition, the vertical extensions 502 could be connected to the guide rods 412 using any other suitable connectors.

Although FIGS. 4A through 5C illustrate examples of presses 400, 500 used to compress and deform food items in order to create flattened food products, various changes may be made to FIGS. 4A through 5C. For example, the use of a manual press is not required. Mechanisms for automatically moving the upper portion and/or the lower portion of the press 400, 500 could also be used, such as a motor and drive shaft. Also, electronic or other locking mechanisms may be employed to prevent or control the movement of the upper portion and/or the lower portion of the press 400, 500.

For instance, infrared or other types of light curtains may extend around the perimeter of the upper portion 404 of the press 400, 500 or the support 401 to detect when an operator's hand or other object is between the upper press portion and the support. Signals from the light curtains may be employed to control whether a locking mechanism is permitted to release the upper portion 404 of the press 400, 500 from its raised position.

Figure 6:
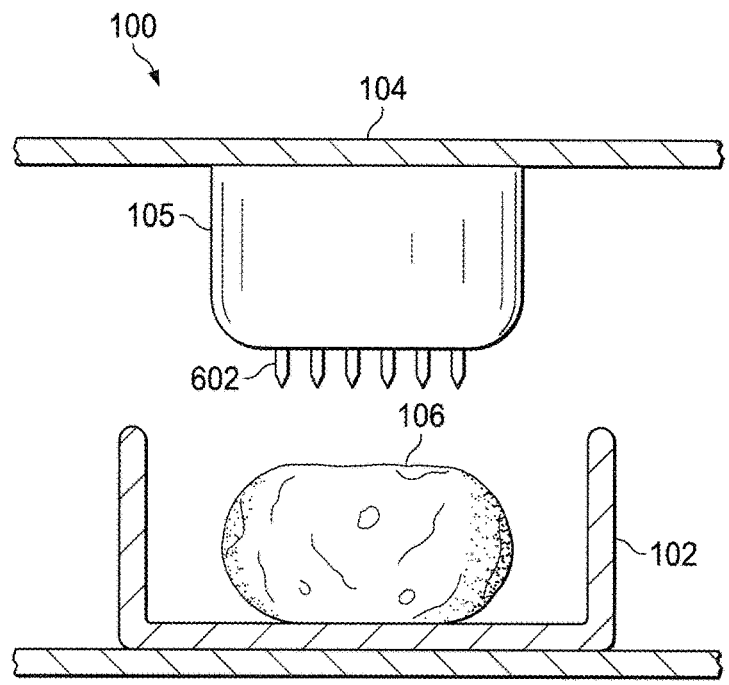
FIGS. 6 through 8 illustrate additional features that could be used with a press that compresses and deforms food items in order to create flattened food products in accordance with this disclosure.
Figure 7:
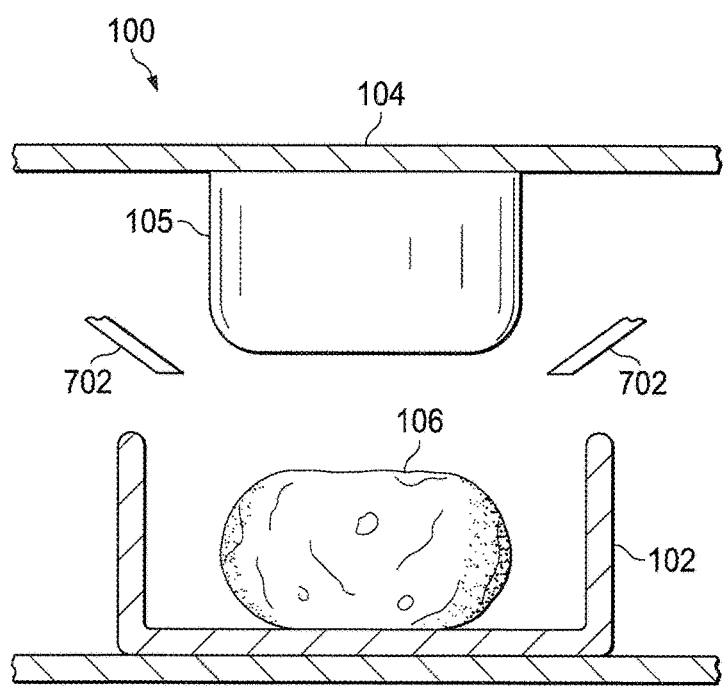
Figure 8:
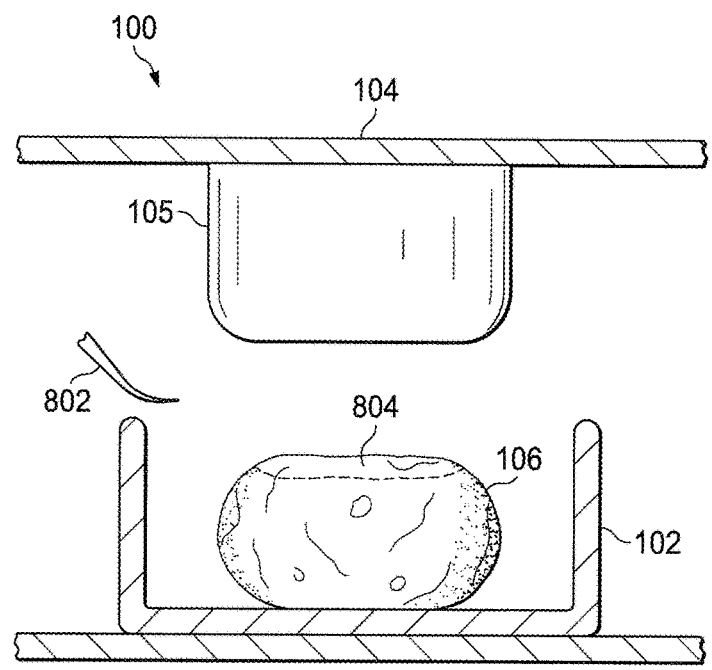

FIGS. 6 through 8 illustrate additional features that could be used with a press that compresses and deforms food items in order to create flattened food products in accordance with this disclosure. As shown in FIG. 6, the lowermost surface of the punch 105 could include projections 602. The projections 602 can be used to penetrate or cut through a food item 106 prior to or during deformation of the food item 106. For example, the projections 602 could include blades, ridges, spikes, or other structures that penetrate the outer skin of food items 106. The projections 602 could also form a pattern, logo, or other design within the flattened food product 106a-106b.

As a particular example, the projections 602 could form a starburst or other pattern of sharp-edged, elevated ridges. Such a design could be used to penetrate the skin of baked potatoes or other food items 106 and to ensure proper deformation as the punch 105 drops onto the food items 106. This could reduce or eliminate the need to cut or otherwise modify the structure of the food items 106 prior to deformation.

The projections 602 include any suitable structures that can penetrate a food item 106. Note that while the projections 602 are shown in FIG. 6 as being equally sized and evenly spaced, this need not be the case. The projections 602 could have any suitable regular or irregular design, and different projections 602 could have different sizes, shapes, or dimensions. As particular examples, there could be more or longer projections 602 in a central region of the punch 105 and fewer, shorter, or no projections 602 in a peripheral region of the punch 105.

As shown in FIG. 7, the press 100 can include or be used in conjunction with one or more blades 702. The blades 702 are used to cut a food item 106 prior to deformation using the punch 105. For example, the blades 702 can be used to cut the skin on top of a baked potato or to otherwise modify the top portion of a food item 106. Among other things, this can make it easier to deform the food item 106.

The one or more blades 702 can be operated in any suitable manner. For example, the one or more blades 702 could be coupled to one or more articulating arms or other structures that can be manually operated to move the blade(s) 702. The one or more blades 702 could also be coupled to one or more structures that move under the control of a motor or other automated mechanism. The blades 702 could be mounted to the frame or other portion of a press 100 or be independent of the press 100.

If multiple blades 702 are provided, the blades 702 can be configured so that the blades 702 do not contact one another. For example, different blades 702 could be moved at different times, or different blades 702 could traverse non-overlapping paths.

Note that the form of the blades 702 shown in FIG. 7 is for illustration only. Any other manual or automated structures could be used to cut or otherwise penetrate at least the top portion of a food item 106. Moreover, the blades 702 could be replaced by other structures that operate without a cutting motion, such as sharp points that penetrate a food item 106 using a stabbing motion.

As shown in FIG. 8, the press 100 can include or be used in conjunction with at least one scooper 802. The scooper 802 can be used to scoop away or otherwise remove an upper portion 804 of a food item 106. The removed upper portion 804 of the food item 106 can then be used in any suitable manner. For example, the upper portion 804 of the food item 106 could be placed with the remaining portion of the food item 106 before or after deformation of the food item 106. The upper portion 804 of the food item 106 could also be discarded or used to form a different food product.

Note that the scooper 802 could be used to remove any portion of the food item 106. In this example, the scooper 802 follows a curved path through the food item 106, although this need not be the case. For example, in other embodiments, the scooper 802 could represent a straight blade or other structure and travel a straight path through the top of the food item 106.

In FIGS. 7 and 8, the height of the form bowl 102 could be modified to accommodate the use of the blades 702 and scoopers 802. For example, the height of the form bowl 102 could be lowered so that the blades 702 or scoopers 802 can contact the food item 106 while still providing adequate height to form a flattened food product in the desired shape.

Although FIGS. 6 through 8 illustrate additional features that could be used with a press that compresses and deforms food items in order to create flattened food products, various changes may be made to FIGS. 6 through 8. For example, while shown as being used with the press 100, the same or similar features could be used with the presses 400, 500 or any other suitable device.

Figure 9:
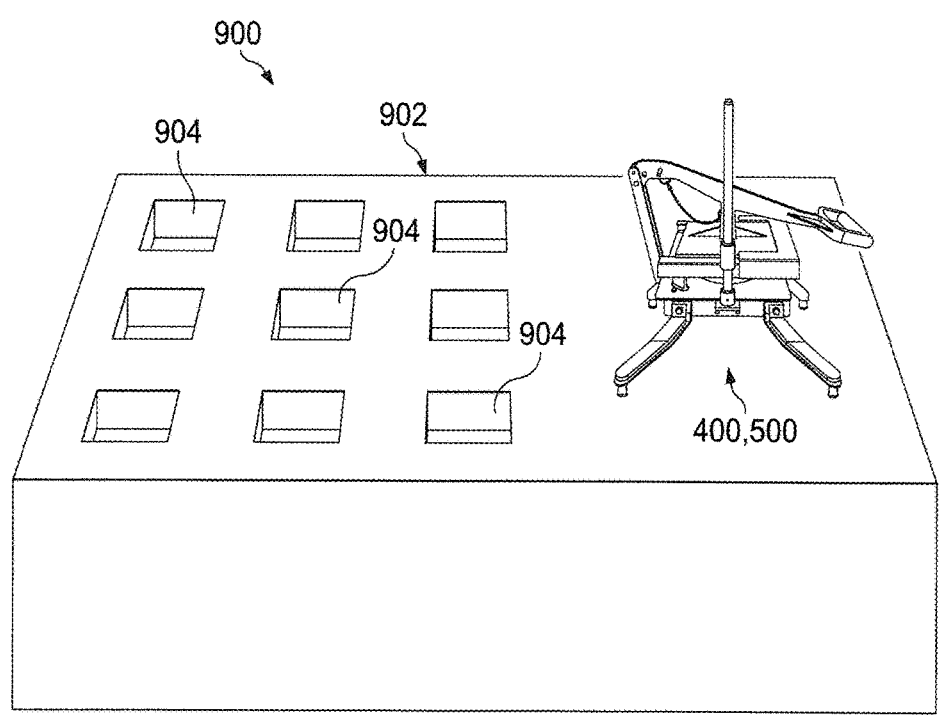
FIGS. 9 and 10 illustrate example systems using at least one press that compresses and deforms food items in order to create flattened food products in accordance with this disclosure.
Figure 10:
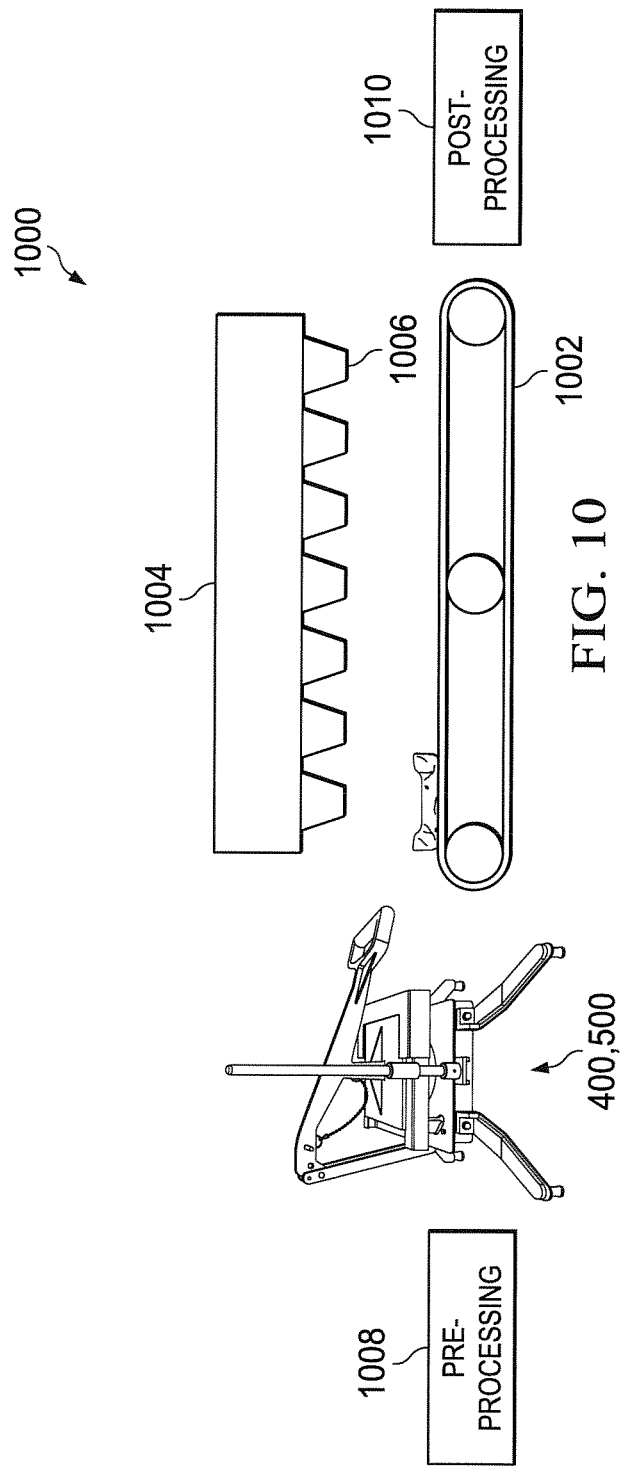

FIGS. 9 and 10 illustrate example systems using at least one press that compresses and deforms food items in order to create flattened food products in accordance with this disclosure. For ease of explanation, the systems shown here are described as using the press 400 or 500 of FIGS. 4A through 5C. However, each system could use any other suitable press, such as the press 100.

As shown in FIG. 9, a system 900 can be used in a restaurant or other food services setting. As shown here, the system 900 includes the press 400, 500 for producing flattened food products. The system 900 also includes at least one counter 902 containing multiple receptacles 904. The receptacles 904 represent structures used to hold multiple toppings. The receptacles 904 could include structures for holding heated or hot toppings, structures for holding cooled or cold toppings, and/or structures for holding toppings at room temperature.

In one example use, customers could enter a line where they can order a baked potato or other food product. For each customer, personnel of a restaurant or other establishment could use the press 400, 500 to create a flattened food product for that customer, such as by placing a baked potato or other food item in a form bowl and pressing and reshaping the food item as described above to form a flattened food product.

With the flattened food product still in the form bowl, each customer can select one or more toppings from the receptacles 904 to be added into or onto the flattened food product. The customers could add the toppings to the flattened food products themselves, or personnel of the restaurant or other establishment could add the toppings to the flattened food products.

Example toppings could include chopped barbeque brisket, chopped or shredded chicken or turkey meat, chili, fajita chicken or beef, pulled pork, chopped ham, smoked salmon, or chopped salami or pepperoni; shredded cheddar or jack cheese or some mixture of shredded cheeses; whipped, herb or garlic butter; sour cream or yogurt; chopped chives, basil, cilantro, or oregano; bacon pieces; crushed red pepper; chopped scallions or red onion; steamed broccoli, green beans or asparagus; grilled corn; black or pinto beans; chopped fresh or sub-dried tomatoes; sautéed spinach; sautéed mushrooms; grilled onions and/or bell pepper; roasted red peppers; sliced jalapeños (fresh or pickled); chopped avocado or guacamole; salsa, barbeque sauce, gravy, marinara sauce, Alfredo sauce, or nacho cheese; or blue cheese, ranch or other salad dressing. Any combination of the above or other toppings may be offered to the customer as choices for adding to the flattened food product.

After receiving the flattened food products with the toppings, the customers can eat the results out of their form bowls, including the edible flattened food products. This could be done in a manner akin to eating a conventional baked potato and the associated toppings or to eating an open-face sandwich. The form bowls may then be cleaned and reused for other servings or discarded, depending on their design.

As shown in FIG. 10, a system 1000 can be used in a mass-production, automated restaurant, or other setting. As shown here, the system 1000 includes at least one press 400, 500 for producing flattened food products. Each press 400, 500 could be manually or automatically operated. Flattened food products from the press 400, 500 can be transported via a conveyor belt 1002 under one or more dispensing systems 1004, each of which can include one or more dispensers 1006 for dispensing toppings into or onto the flattened food products. The dispensing of the toppings could be automated or controlled by one or more operators.

Various pre-processing operations 1008 and post-processing operations 1010 could also occur in the system 1000. For example, the pre-processing operations 1008 could include cleaning the food items prior to deformation. The pre-processing operations 1008 could also include cutting top or other surfaces of each food item, scooping or otherwise removing top or other portions of each food item, or otherwise modifying at least part of each food item prior to deformation. As a particular example of the pre-processing, a top portion of a food item could be removed, and an interior portion of the food item could be mashed, pierced, or otherwise modified to increase the ease of deforming the food item. The post-processing operations 1010 can include packaging the flattened food products and their toppings for service to customers, storage, or transport. Any other or additional pre-processing operations 1008 or post-processing operations 1010 could be performed.

Note that while a single conveyor belt 1002 is shown here, the system 1000 could include multiple conveyor belts. For example, one or more conveyor belts could be used to pass food items through the pre-processing operations 1008 for delivery to the one or more presses 400, 500. The one or more presses 400, 500 could compress the food items on the conveyor belt(s), such as when the food items are placed on the conveyor belt(s) in form bowls. The flattened food products could then be transported via the conveyor belt 1002, which could represent part of the same conveyor belt delivering food items to the presses 400, 500 or a different conveyor belt.

Although FIGS. 9 and 10 illustrate examples of systems using at least one press that compresses and deforms food items in order to create flattened food products, various changes may be made to FIGS. 9 and 10. For example, FIGS. 9 and 10 are merely meant to illustrate example systems that could use one or more presses for forming flattened food products. The presses 400, 500 (or the press 100) could be used in any other suitable manner and in any other suitable system.

Figure 11:
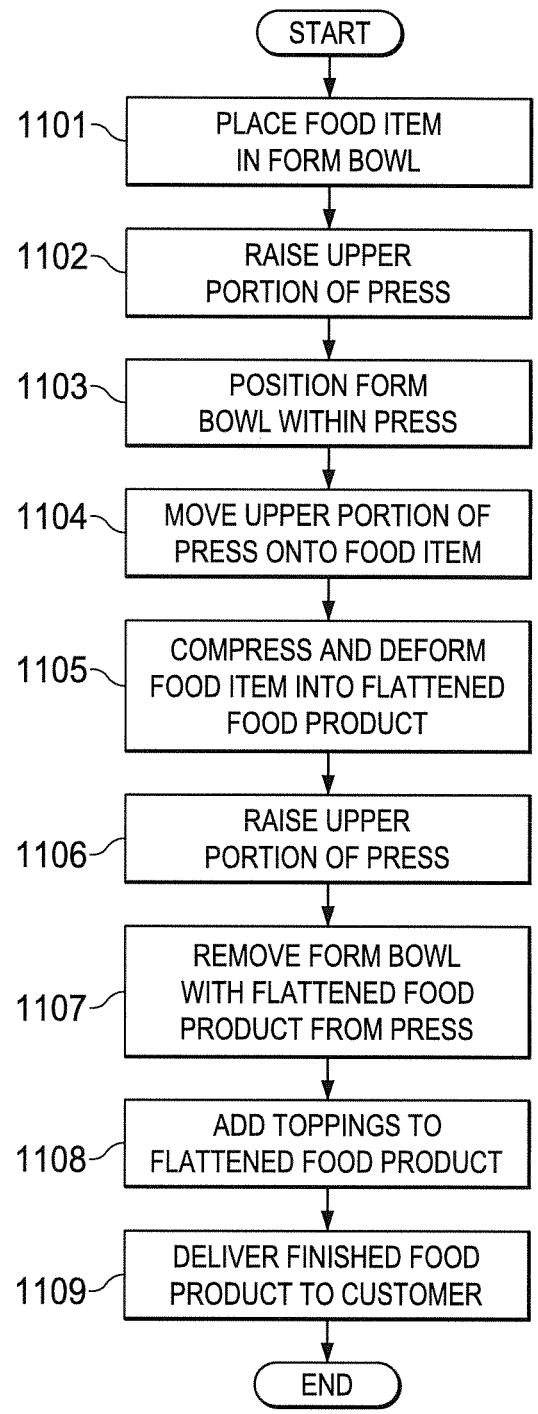
FIG. 11 illustrates an example method for producing a flattened food product by compression and deformation of a food item in accordance with this disclosure.

FIG. 11 illustrates an example method 1100 for producing a flattened food product by compression and deformation of a food item in accordance with this disclosure. While the example process flow depicted in FIG. 11 is described with respect to the presses 400, 500 of FIGS. 4A through 5C, the method 1100 could be used by any other suitable device (such as the press 100).

As shown in FIG. 11, a food item is placed into a form bowl at step 1101. This could include, for example, placing a baked potato or other food item 106 into a form bowl 102. An upper portion of a press is raised at step 1102, and the form bowl is positioned within the press at step 1103. This could include, for example, raising the upper portion 404 of the press 400, 500 using the lift arm 414 and optionally locking the lift arm 414 in place. Note that if the upper portion 404 of the press is biased upward (such as in the press 500), no action may be needed in step 1102 to actively raise the upper portion 404 of the press. This could also include placing the form bowl 102 into a position defined by the guide tabs 417.

The upper portion of the press is moved onto the food item at step 1104, compressing and deforming the food item to form a flattened food product at step 1105. The upper portion 404 of the press 400 could be allowed to drop under the force of gravity. This could include, for example, unlocking the lift arm 414 and allowing the upper portion 404 of the press 400 to fall. If dropping the upper portion 404 of the press 400 does not satisfactorily form the flattened food product from the food item, the mass of the weight member 413 could be increased or decreased as appropriate. The upper portion 404 of the press 500 could also or alternatively be pressed downward with manual assistance. This could include, for example, an operator depressing the handle 415 to force the lift arm 414 downward, causing the upper portion 404 of the press 500 to move downward. Note that a combination of approaches could also be used. For instance, the upper portion 404 of the press 400 could be allowed to drop under the force of gravity, and downward pressure may be applied to the handle 415 at the end of the lift arm 414 to complete or "set" the formation of the flattened food product (although such pressure could be redundant if the weight of the upper portion 404 of the press 400 is properly selected and the food item 106 is sufficiently cooked). The flattened food product could form a disc, flat, dish, bowl, or other form.

The upper portion of the press is raised at step 1106, and the form bowl is removed from the press at step 1107. This could include, for example, raising the lift arm 414 and locking the lift arm 414 in place. Note that step 1106 could involve actively raising the lift arm 414 or allowing the spring 506 to raise the lift arm 414.

One or more toppings, such as of the types described above, are added to the flattened food product at step 1108. This could include, for example, a customer placing one or more toppings onto the flattened food product as desired or a restaurant or other employee placing one or more toppings onto the flattened food product as directed by the customer.

The resulting finished food product (possibly still within the form bowl) is delivered to the customer at step 1109. As described above, the customer can eat the finished food product directly from the form bowl 102, and the form bowl 102 can be cleaned and reused. Alternatively, the finished food product may be transferred to a paper-based or other holder to be eaten locally or at a remote location. For example, the form bowl may be lined with a thin flexible paper or plastic sheet prior to being used to form the finished food product in order to facilitate such a transfer, or the form bowl itself can be provided to a customer.

The process of forming a flattened food product in the manner described with respect to steps 1101-1106 could be performed within the view of a customer after the customer places an order. This can allow the customer to enjoy the theatrics or "show" of forming the flattened food product from a food item, which can form part of the appeal of a restaurant or other establishment to its customers.

Although FIG. 11 illustrates one example of a method 1100 for producing a flattened food product by compression and deformation of a food item, various changes may be made to FIG. 11. For example, while shown as a series of steps, various steps in FIG. 11 could overlap, occur in parallel, occur in a different order, or occur any number of times. Also, as noted above, the use of a form bowl is optional, and the upper portion of the press may not move or may not be the only portion of the press that moves.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An apparatus comprising:
a press configured to compress at least a portion of a food item to deform the food item and form a flattened food product, wherein the press comprises:
 a movable upper press portion;
 a lower press portion;
 a lift arm pivotally attached to the movable upper press portion, the lift arm configured to raise and lower the movable upper press portion;
 at least one lever arm pivotally attached to the lift arm and pivotally attached to the lower press portion, each lever arm having a first end coupled to the lower press portion and an opposing second end, the second end being above the movable upper press portion when the movable upper press portion is in a lowered position, the second end being below at least part of the movable upper press portion when the movable upper press portion is in a raised position;
 a punch projecting from the movable upper press portion, the punch configured, when the movable upper press portion is lowered by the lift arm, to reshape the food item such that the flattened food product has at least a flattened central portion; and
 multiple guide rods coupled to the lower press portion and extending upward from the lower press portion to at least the moveable upper press portion, wherein the movable upper press portion comprises multiple annular guides configured to slide up and down along the guide rods in response to the lift arm raising and lowering the movable upper press portion.

2. The apparatus of claim 1, wherein the lower press portion is configured to receive the food item.

3. The apparatus of claim 1, wherein:
the at least one lever arm comprises a pair of lever arms;
the lift arm is pivotally attached to the movable upper press portion at or near a center of the lift arm; and
one end of the lift arm is pivotally attached to the pair of lever arms.

4. The apparatus of claim 3, wherein the press further comprises:

a pin configured to be inserted through a hole in the lift arm and through holes in the pair of lever arms when the holes in the lift arm and the lever arms are aligned in order to lock the movable upper press portion in the raised position.

5. The apparatus of claim 1, wherein the press further comprises:
a connecting portion coupling the guide rods or extensions from the guide rods; and
a spring coupled to the connecting portion and to the lift arm, the spring configured to pull on the lift arm and bias the movable upper press portion in the raised position.

6. The apparatus of claim 1, wherein the movable upper press portion is biased in the raised position.

7. The apparatus of claim 1, wherein:
the lower press portion is configured to receive a form bowl that is configured to hold the food item; and
at least part of the punch is configured to fit within the form bowl and deform the food item.

8. The apparatus of claim 7, wherein the form bowl is removable from the lower press portion with the flattened food product therein to allow an addition of one or more toppings onto the flattened food product.

9. The apparatus of claim 1, wherein the press further comprises:
one or more guide tabs projecting from a surface of the lower press portion against which a form bowl is selectively positioned.

10. The apparatus of claim 1, wherein the press is configured to compress and reshape the food item to a thickness of about 1.0 to 1.5 inches.

11. The apparatus of claim 1, wherein the movable upper press portion has a larger width than the punch and extends laterally beyond all sides of the punch.

12. A method comprising:
placing a food item into a press, the press having a movable upper press portion, a lower press portion, and a lift arm pivotally attached to the movable upper press portion, the lift arm configured to raise and lower the movable upper press portion; and
compressing at least a portion of the food item using the press to deform the food item and form a flattened food product;
wherein at least one lever arm is pivotally attached to the lift arm and is pivotally attached to the lower press portion, each lever arm having a first end coupled to the lower press portion and an opposing second end, the second end being above the movable upper press portion when the movable upper press portion is in a lowered position, the second end being below at least part of the movable upper press portion when the movable upper press portion is in a raised position;
wherein a punch projects from the movable upper press portion, the punch configured, when the movable upper press portion is lowered by the lift arm, to reshape the food item such that the flattened food product has at least a flattened central portion;
wherein multiple guide rods are coupled to the lower press portion and extend upward from the lower press portion to at least the moveable upper press portion; and
wherein the movable upper press portion comprises multiple annular guides configured to slide up and down along the guide rods in response to the lift arm raising and lowering the movable upper press portion.

13. The method of claim 12, wherein:
the method further comprises placing the food item on the lower press portion; and
compressing at least the portion of the food item comprises at least one of:
allowing the punch to drop onto the food item; and
depressing the punch onto the food item using the lift arm.

14. The method of claim 12, wherein:
the at least one lever arm comprises a pair of lever arms;
the lift arm is pivotally attached to the movable upper press portion at or near a center of the lift arm; and
one end of the lift arm is pivotally attached to the pair of lever arms.

15. The method of claim 12, further comprising:
biasing the movable upper press portion in the raised position.

16. The method of claim 12, further comprising:
placing the food item in a form bowl; and
positioning the form bowl on the lower press portion;
wherein compressing at least the portion of the food item comprises moving at least part of the punch within the form bowl to deform the food item.

17. The method of claim 16, wherein positioning the form bowl comprises positioning the form bowl against one or more guide tabs projecting from a surface of the lower press portion.

18. The method of claim 12, wherein at least the flattened central portion of the flattened food product corresponds in shape to a surface of the punch.

19. The method of claim 12, further comprising:
adding one or more toppings onto the flattened food product.

20. An apparatus comprising:
a press configured to compress at least a portion of a food item to deform the food item and form a flattened food product, wherein the press comprises:
a movable upper press portion;
a lower press portion;
a lift arm pivotally attached to the movable upper press portion, the lift arm configured to raise and lower the movable upper press portion;
a punch projecting from the movable upper press portion downward toward the lower press portion, the punch configured, when the movable upper press portion is lowered by the lift arm, to reshape the food item such that the flattened food product has at least a flattened central portion;
multiple guide rods coupled to the lower press portion and extending upward from the lower press portion and above the moveable upper press portion, wherein the movable upper press portion comprises multiple annular guides configured to slide up and down along the guide rods in response to the lift arm raising and lowering the movable upper press portion; and
a pair of lever arms pivotally attached to the lift arm and pivotally attached to the lower press portion, the lift arm pivotally attached to the movable upper press portion at or near a center of the lift arm, one end of the lift arm pivotally attached to the pair of lever arms, each lever arm having a first end coupled to the lower press portion and an opposing second end, the second end being above the movable upper press portion when the movable upper press portion is in a lowered position, the second end being below at least part of the movable upper press portion when the movable upper press portion is in a raised position.

\* \* \* \* \*